(12) United States Patent
Babel

(10) Patent No.: US 9,146,139 B2
(45) Date of Patent: Sep. 29, 2015

(54) MEASUREMENT DEVICE FOR DETERMINING A PROCESS VARIABLE

(71) Applicant: KROHNE Analytics GmbH, Duisburg (DE)

(72) Inventor: Wolfgang Babel, Weil der Stadt (DE)

(73) Assignee: KROHNE Messtechnik GmbH, Duisburg (DE)

( * ) Notice: Subject to any disclaimer, the term of this patent is extended or adjusted under 35 U.S.C. 154(b) by 110 days.

(21) Appl. No.: 13/646,997

(22) Filed: Oct. 8, 2012

(65) Prior Publication Data

US 2013/0340540 A1    Dec. 26, 2013

(30) Foreign Application Priority Data

Jun. 26, 2012    (DE) .......................... 10 2012 012 527

(51) Int. Cl.
*G01D 11/24* (2006.01)
*G01L 19/14* (2006.01)
*G01P 1/02* (2006.01)

(52) U.S. Cl.
CPC ................................... *G01D 11/245* (2013.01)

(58) Field of Classification Search
CPC .. G01D 11/00; G01D 11/245; G01L 19/0084; G01L 19/14; G01L 19/148
USPC ....................... 73/865.8, 152.01–152.62, 756; 439/151–152, 176, 266, 278, 286, 307, 439/312, 377, 512, 744
See application file for complete search history.

(56) References Cited

U.S. PATENT DOCUMENTS

| | | | |
|---|---|---|---|
| 6,468,092 B1 | 10/2002 | Gräff et al. | |
| 6,883,383 B2 * | 4/2005 | Alznauer et al. | ................. 73/756 |
| 7,607,353 B2 | 10/2009 | Kopp | |
| 8,522,051 B2 * | 8/2013 | Hankhofer et al. | ............ 713/194 |
| 2006/0272758 A1 * | 12/2006 | Yin et al. | ........................ 152/427 |
| 2008/0026610 A1 * | 1/2008 | Frake et al. | .................... 439/76.1 |
| 2008/0134811 A1 * | 6/2008 | Milanovic et al. | ............ 73/866.5 |
| 2009/0312846 A1 * | 12/2009 | Ferraro et al. | ................... 700/11 |
| 2011/0226038 A1 * | 9/2011 | Donahoe et al. | .............. 73/12.05 |
| 2011/0273165 A1 * | 11/2011 | Palassis et al. | ................. 324/149 |

FOREIGN PATENT DOCUMENTS

| | | |
|---|---|---|
| DE | 42 34 133 A1 | 4/1994 |
| DE | 196 10 167 C1 | 2/1997 |
| DE | 198 12 296 C1 | 11/1999 |
| DE | 299 22 206 U1 | 4/2000 |

(Continued)

*Primary Examiner* — Eric S McCall
*Assistant Examiner* — Anthony W Megna Fuentes
(74) *Attorney, Agent, or Firm* — Roberts Mlotkowski Safran & Cole, P.C.; David S. Safran

(57) ABSTRACT

A measurement device (1) for determining at least one process variable with a sensor element (2) for measuring the process variable and with an electronic component (3), the sensor element (2) being connected to the electronic component (3) via at least one electrical conductor (4) has a connection, made to be as reliable as possible, between a sensor element and the electronic component due to the provision of an adapter unit (5). The adapter unit (5) guides at least one electrical conductor (4). Furthermore, the adapter unit (5), the sensor element (2) and the electronic component (3) are configured and matched to one another such that the adapter unit (5) set a minimum distance between the sensor element (2) and electronic component (3).

3 Claims, 6 Drawing Sheets

(56) References Cited

FOREIGN PATENT DOCUMENTS

| | | |
|---|---|---|
| DE | 10 2008 063 691 A1 | 6/2010 |
| EP | 1 365 478 B1 | 12/2004 |
| WO | 2005/025015 A1 | 3/2005 |
| WO | 2008/052845 A2 | 5/2008 |

* cited by examiner

MEASUREMENT DEVICE FOR DETERMINING A PROCESS VARIABLE

BACKGROUND OF THE INVENTION

1. Field of the Invention

The invention relates to a measurement device for determining at least one process variable with at least one sensor element for measuring the process variable and with at least one electronic component, the sensor element being connected to the electronic component via at least one electrical conductor.

2. Description of Related Art

In modern process and automation engineering, to monitor and determine process variables, measurement devices are used which generate a measured quantity which is dependent on the process variable which is to be measured. The measured quantity is generally an electrical signal which is accessible for evaluation and further processing. The process variables are, for example, the flow rate, the pH value, the liquid level or the temperature of a medium.

These measurement devices of the prior art generally have at least one sensor element which generally comes into contact or interacts with a process medium and is used for the actual measurement, and at least one downstream electronic component which, optionally, controls the measurement of the sensor element or evaluates or further processes the measurement signals of the sensor element. For the connection between the sensor element and the electronic component, in the prior art, generally wires of the sensor element are soldered to the electronic component. Afterwards, the electronic component and the sensor element are pushed together in order to form the measurement device with other components or a housing, etc. Pushing together partially flattens or kinks the wires and solder sites can even break. In this way, high scrap rates can arise in the production and/or maintenance of the measurement devices under consideration here. This is especially problematical in those measurement devices which are assembled more than once, therefore in the initial production, and when they must be disassembled and assembled repeatedly due to their use. This applies, for example, to sensor elements which, depending on the application, have only a short service life, for example, in sensor elements for pH measurement.

SUMMARY OF THE INVENTION

Therefore, a primary object of the invention is to provide a measurement device which comprises a connection between a sensor element and the electronic component that is as reliable as possible.

This object is achieved, first of all, essentially in the measurement device under consideration, in that there is at least one adapter unit. Here, the adapter unit guides at least one electrical conductor at least in sections. Furthermore, the adapter unit, the sensor element and the electronic component are configured and matched to one another such that the adapter unit dictates a minimum distance between the sensor element and electronic component, so that the adapter unit prevents further approach between the sensor element and the electronic component beyond a minimum distance.

In the measurement device in accordance with the invention, an adapter unit is used to support the transition between the electronic component and the sensor element. Because the direct contact is bridged by the adapter unit, a minimum distance between the electronic component and sensor element can be defined and guidance of at least one electrical conductor can be implemented. Stabilization is introduced into the measurement device, and keeps away loads of the electrical conductor or of the respective connections to the electronic component and to the sensor element. In one configuration, the adapter unit is a plastic element which is molded or injected.

In one configuration, the adapter unit is located at least partially between the sensor element and the electronic component. In an alternative configuration, the adapter unit encompasses the sensor element and the electronic component and essentially limits the minimum distance by a sleeve shape.

The adapter unit has at least one continuous recess, especially in the form of a hole or bore for guiding at least one electrical conductor. If there are several electrical conductors, in one configuration, the number of recesses is increased up to preferably a maximum one recess per electrical conductor. The conductors can be especially more or less movable wires or pins.

The distance between the sensor element and the electronic component in one configuration is limited by the adapter unit having a stop surface, especially in the form of a bridge, on at least an end facing the sensor element or the electronic component. The stop surface offers a mechanical motion limiter, the minimum distance resulting from the configuration of the adapter unit and the ends of the sensor element and electronic component which face one another.

In another configuration, the adapter unit has an end which is facing the sensor element or the electronic component and which is configured such that, between the adapter unit and the sensor element, and between the adapter unit and the electronic component, at least partial positive locking arises. Positive locking—for example, by the components mutually snapping into one another—makes it possible, for example, to captively connect the adapter unit with the electronic component or with the sensor element in a single production step so that reliable transport is possible for a further step.

For simplified production, in one configuration it is provided that the electronic component is located in a partial component which is especially at least partially potted. In order to protect electronic components against the action of moisture and also to ensure increased safety, pottings have been used in the prior art. In the configuration it is provided that the electronic component is located in a preferably already potted partial component of the entire measurement device and forms one such component. Preferably at least one electrical conductor extends or accordingly many electrical conductors extend out of the partial component and thus in one configuration also out of the potting in order to be connected to the sensor element via or by the adapter unit.

In another configuration, in the partial component which encompasses the electronic component there is at least one circuit board which bears electronic components and which is fixed especially by an essentially pin-shaped retaining element, the retaining element being located especially on the side of the circuit board opposite the sensor element. Furthermore, in the partial component, in one configuration, there is at least one sleeve whose wall is made partially rosette-shaped, and thus, allows potting of the partial component from the side of the rosette.

Another configuration calls for there to be at least one sleeve. Here, the sleeve surrounds at least one sensor element at least in part and can be connected to the partial component, especially via a turning motion. A turning connection is implemented, for example, via a respective inner and outer thread.

In another configuration, at least one electrical conductor, especially in the form of a pin, borders one end of the sensor element or one end of the electronic component. In this configuration, at least one electrical conductor projects over the sensor element and the electronic component.

Depending on the type of sensor element and especially also depending on how many measured quantities and on how the actual measurement is taken, the sensor element can have different forms especially on the end facing the sensor element. Therefore, the end can be essentially flat or it can have different elevations. Thus, depending on the version, the sensor element has at least one section on an end which is facing the electronic component that is raised or offset essentially relative to the remainder of the end. Depending on the configuration, the section can be essentially cylindrical and can be located relatively centrally in the middle of the end.

In the previous configurations, the sensor element is used to measure the pH and/or the chlorine content and/or the oxygen content. Further measured quantities can be, for example, the flow rate, conductivity, temperature, oxygen content, or liquid level.

In particular there is a plurality of possibilities for embodying and developing the measurement device in accordance with the invention. In this respect reference is made to the following detailed description of exemplary embodiments in conjunction with the accompanying drawings.

DETAILED DESCRIPTION OF THE INVENTION

Figure 1:
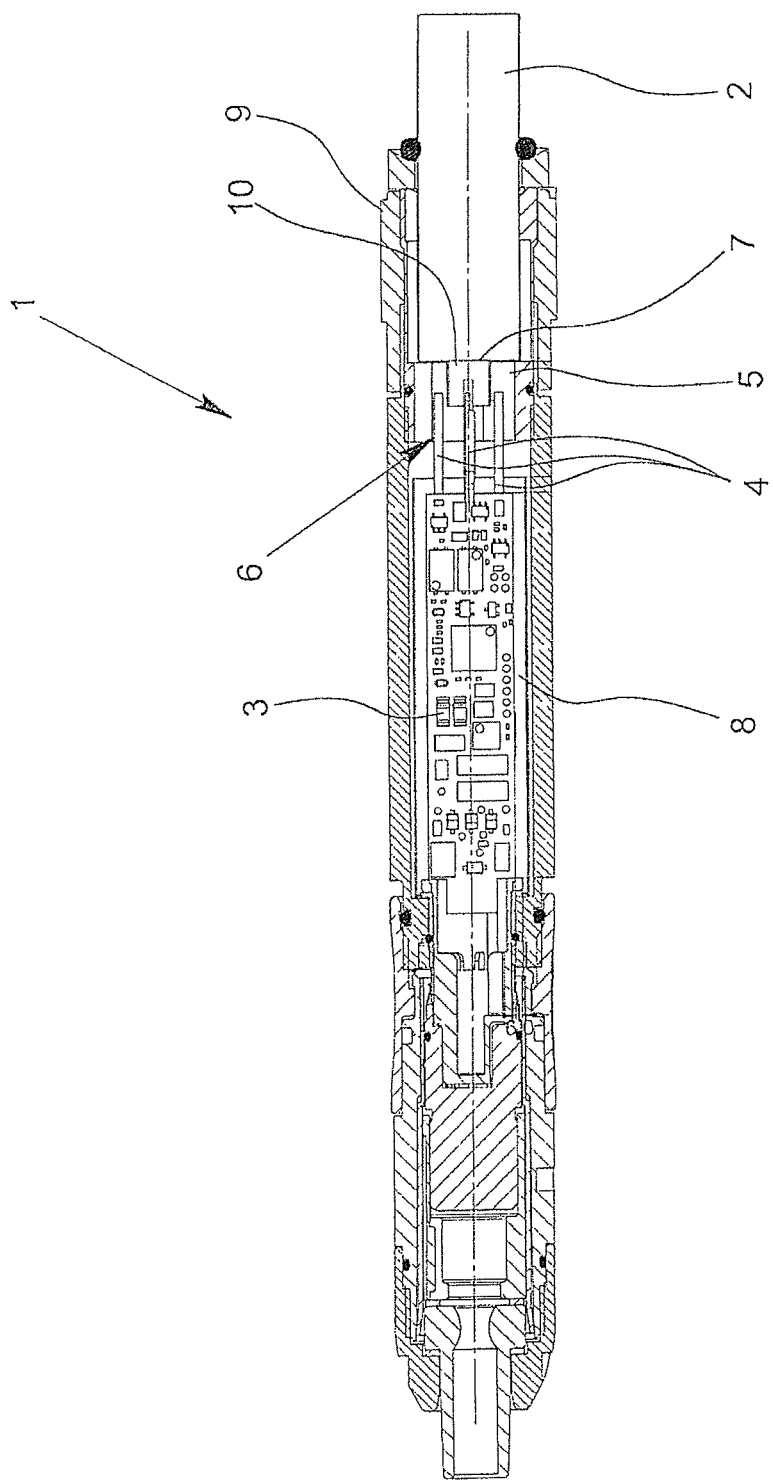
FIG. 1 is a schematic sectional view of a measurement device which illustrates essentially the functional active relationships.

FIG. 1 shows a section through one measurement device 1 in accordance with the invention which is used to measure pH and temperature. For this reason, the sensor element 2 is made as a glass body with elements that are sensitive to pH and temperature. The sensor element 2 is bordered by an electronic component 3 which, here, has at least one circuit board with several components. The connection between the electronic component 3 and the sensor element 2 takes place via electrical conductors 4. For protection of these electrical conductors 4 and the contacts made via solder sites, the adapter unit 5 is located between one end of the electronic component 3 and the sensor element 2. In the adapter unit 5, the electrical conductors 4 are guided and a minimum distance between the electronic component 3 and the sensor element 2 is defined by the adapter unit 5. For this purpose, the adapter unit 5 has continuous recesses 6 in which the electrical conductors 4 run. Furthermore, on the ends of the adapter unit 5, there are stop surfaces 7 which purely mechanically prevent the electronic component 3 and sensor element 2 from being pushed against one another.

The electronic component 3, for purposes of simplified installation, is an already potted partial component 8 from which the electrical conductors 4 project with a suitable length. This partial component 8 can be especially called a plug head. The sensor element 2 is surrounded by a sleeve 9 which is connected to the partial component 8 via a rotary motion. During attachment, especially the electronic component 3 and the sensor element 2 are not twisted relative to one another so that forces in this respect do not act on the electrical conductors 4 or the contacts which have been made.

One particular of the sensor element 2 is that the sensor element 2, which is made essentially rotationally symmetrical, like the entire measurement device on the end facing the electronic component 3, has an elevated section 10.

Figure 2:
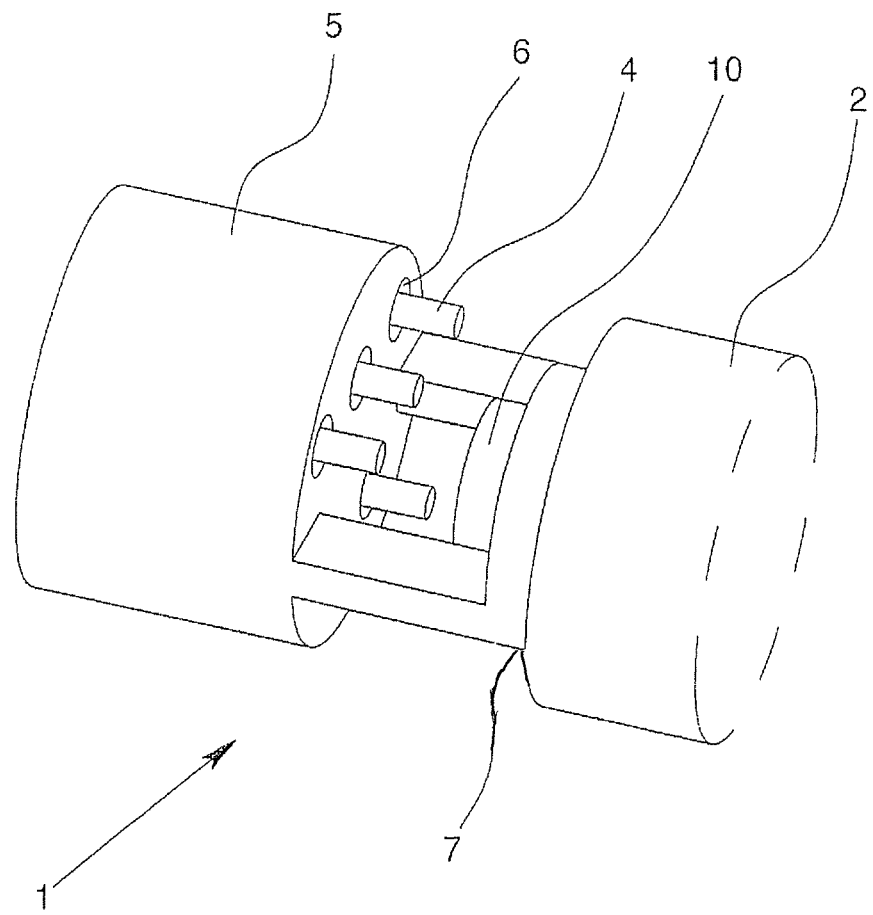
FIG. 2 is a perspective view of an extract of some elements of a measurement device according to a first version.

FIG. 2 shows a section between the electronic component (which is not shown here) and the sensor element 2. For the sake of clarity, the electrical conductors (wires as conventional in the prior art) of the sensor element 2 are not shown. The electrical conductors 4 of the electronic component 3 project through the recesses 6 of the adapter unit 5 in the direction of the sensor element 2 and are soldered to the wires of the sensors, wires. The adapter unit 5 has essentially the shape of a solid cylinder from which two legs extend and which, in turn, are connected to one another on their opposite end by a ring.

Between the legs and encompassed by the ring is the section 10 of the sensor element 2 which is elevated relative to the remaining surface of the end of the sensor element 2. It can be recognized that the adapter unit 5 dictates a well defined minimum distance between the sensor element 2 and the electronic component 3 (which is at the opposite side of the cylinder as shown in FIG. 1) and that, at the same time, an open space for the connection of the electrical contacts is produced and protected between the legs.

One alternative or addition to the configuration shown in FIG. 2, which alternative or addition is not shown, is that the electrical conductors 4 do not extend through the adapter unit 5, but run within the adapter unit 5 onto solder contacts which in turn are tightly pressed into the recesses of the adapter unit 5 and partially project out of the adapter unit 5. Then, the wires of the sensor or sensors are soldered to these solder contacts in further production steps. In other words: the adapter unit 5 of this unillustrated configuration has sockets-solder contacts which are pressed tightly in.

Here, for example, the sequence of production steps is as follows: The partial component 8 is produced as a potted plug head without the adapter unit 5. The wires of the sensor element 2 are soldered to the solder contacts of the adapter unit 5, for example, by a manufacturer of the sensor element. Then, the electrical conductors 4 of the electronic component which project out of the potted partial component 8 are introduced into the adapter unit 5. Then, the sleeve 9 is connected to the partial component 8, especially screwed to it, and for example, the arrangement is potted from the side facing the sensor element 2 via an at least partially rosette-shaped end of the sleeve 9.

In one combination, the electrical conductors 4 can also partially project out of the adapter unit 5 and in part run at the height of the above described solder contacts.

Figure 3:
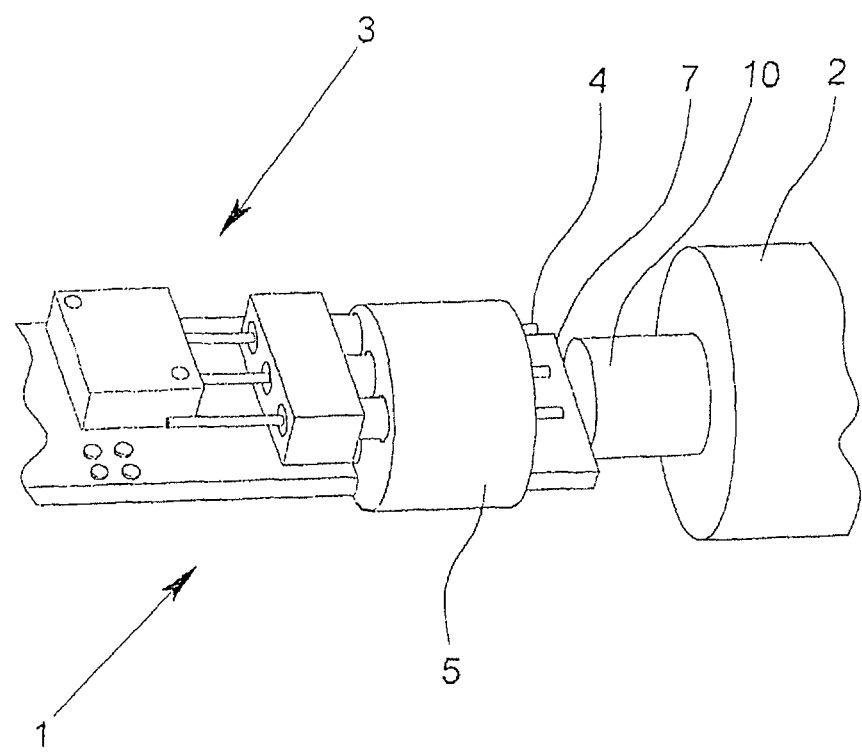
FIG. 3 is a perspective view of an extract of some elements of a measurement device according to a second version.

FIG. 3 shows a variation of the measurement device 1 from the one according to FIG. 2, here, the difference being that the adapter unit 5 with a cross piece as the stop surface 7 meets the elevated section 10 of the sensor element 2. With the other end, the adapter unit 5 strikes the circuit board of the electronic component 3 on which the components for implementing a circuit are located. The electrical conductors 4 are located above the circuit board, and thus, emerge from the electronic component 3. In another configuration, which is not shown, in a stop surface 7 which is configured essentially as in FIG. 3, there is a recess which is configured to fit the elevated section 10 of the sensor element 2 and which partially accommodates the elevated section 10, and thus, is used for additional fixing.

Figure 4:
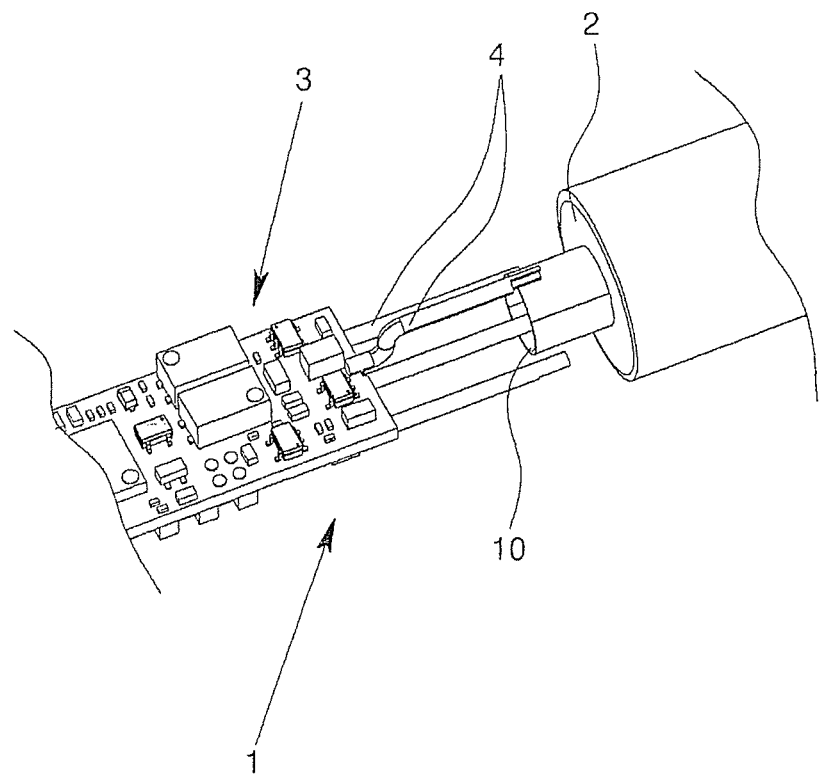
FIG. 4 is a perspective view of another extract of some elements of a measurement device.

FIG. 4 omits the adapter unit 5 so that the linkage of the electrical conductor 4 to the circuit board of the electronic component 3 can be better recognized. The electrical conductors 4 are especially four pins here which are guided differently. Three conductors lie in one plane and the fourth pin is guided elevated above the middle pin of the three pins after a bent section. This arrangement can ensure the correct orientation of the components relative to one another for installation. The lower middle pin is inserted into the elevated section 10 of the sensor element 2. Depending on the arrangement of the other components, it can also be necessary for more than only one pin to be offset.

Figure 5:
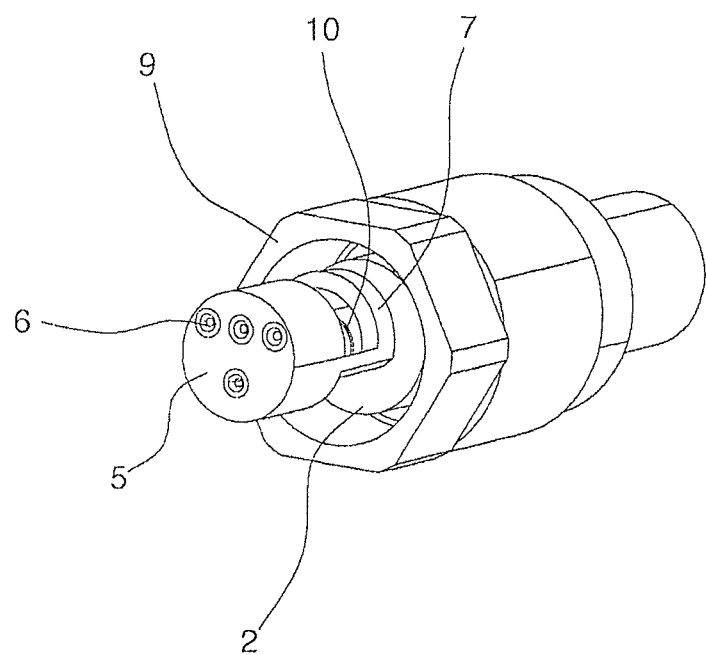
FIG. 5 is a perspective view of another extract of some elements of the measurement device of FIG. 2.

FIG. 5 shows a sensor element 2 of the measurement device 1 in the state in which the sensor element 2 is partially surrounded by a sleeve 9 which in further mounting is preferably screwed into the partial component 8 which encompasses the electronic component 3. The stop surface 7 of the adapter unit 5 facing the sensor element 2 formed of a ring segment element which partially encompasses the elevated section 10. On the end of the adapter unit 5 facing the electronic component, the four continuous recesses 6 which accommodate and guide the electrical conductors can be recognized and which are made conical here for facilitated introduction of the conductors.

Figure 6:
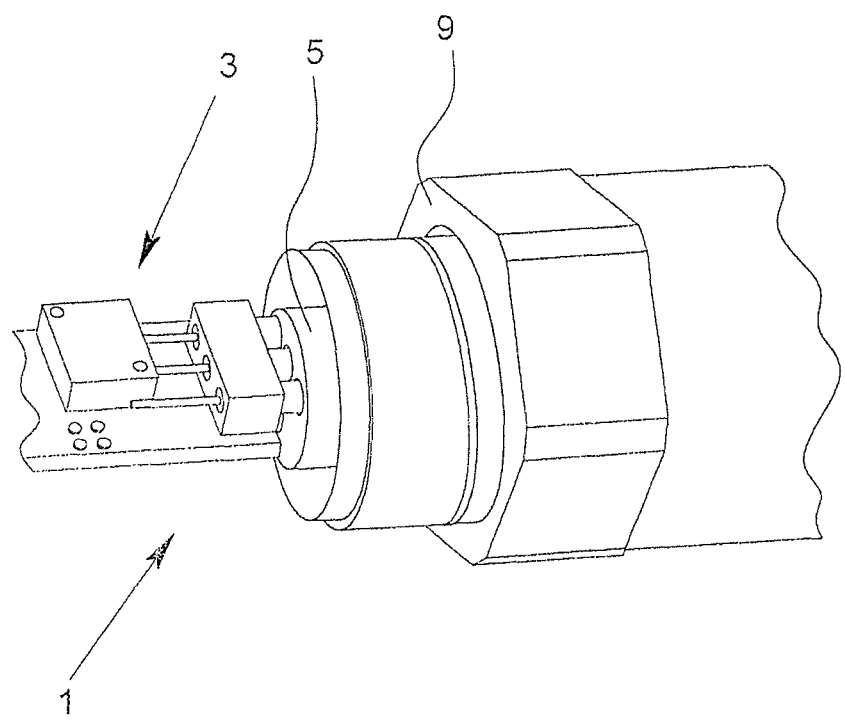
FIG. 6 is a perspective view of the arrangement of FIG. 3 with a sleeve.

FIG. 6 shows the outer thread of the sleeve 9 via which the sleeve 9 is rotationally connected to the partial component. The components of the measurement device are mounted especially such that, after connecting the electronic component 3 to the sensor element 2, they are not twisted relative to one another. The adapter unit 5 here also limits the minimum distance which the electronic component 3 can assume relative to the sensor element.

What is claimed is:

1. A measurement device for determining at least one process variable, comprising:
    at least one electronic component,
    a sensor element for measuring a process variable,
    an end of said sensor element facing said at least one electronic component having an essentially cylindrical section that is located centrally in a middle of said end and is elevated relative to a remainder of said end,
    said sensor element being connected to the at least one electronic component via at least one electrical conductor, and
    an adapter unit,
    the adapter unit guiding at least a section of the at least one electrical conductor and being located at least partially between said sensor element and said at least one electronic component,
    wherein said adapter unit, said sensor element and the at least one electronic component are configured and matched to one another such that said adapter unit sets a minimum distance that is the closest that said sensor element and the at least one electronic component can approach each other,
    wherein an end of said adapter unit facing said sensor element has a stop surface in the form of a ring segment of less than 360°, and
    wherein said stop surface encompasses said essentially cylindrical section of said end of said sensor element facing said at least one electronic component.

2. A measurement device in accordance with claim 1, wherein the at least one electronic component is located in a partial component which is at least partially potted, wherein a sleeve surrounds at least a part of said sensor element, and wherein said sleeve is connected to said partial component.

3. A measurement device in accordance with claim 1, wherein said sensor element is adapted for measuring at least one of pH, chlorine content and oxygen content.

\* \* \* \* \*